United States Patent
Gibert

(10) Patent No.: US 7,299,702 B2
(45) Date of Patent: Nov. 27, 2007

(54) APPARATUS FOR MONITORING AN AIRCRAFT FLAP AND APPLICATION OF A DYNAMOMETRIC ROD

(75) Inventor: Francis Gibert, Les Mesnuls (FR)

(73) Assignee: FGB Instrumentation, Les Clayes-Sous-Bois (FR)

( * ) Notice: Subject to any disclaimer, the term of this patent is extended or adjusted under 35 U.S.C. 154(b) by 207 days.

(21) Appl. No.: 10/520,938

(22) PCT Filed: Jul. 15, 2003

(86) PCT No.: PCT/FR03/02231

§ 371 (c)(1),
(2), (4) Date: Oct. 31, 2005

(87) PCT Pub. No.: WO2004/008097

PCT Pub. Date: Jan. 22, 2004

(65) Prior Publication Data

US 2006/0114126 A1  Jun. 1, 2006

(30) Foreign Application Priority Data

Jul. 16, 2002 (FR) .................... 02 09006

(51) Int. Cl.
*G01M 5/00* (2006.01)
(52) U.S. Cl. ...................................................... 73/802
(58) Field of Classification Search .................. 73/761, 73/802

See application file for complete search history.

(56) References Cited

U.S. PATENT DOCUMENTS

| 3,695,096 A | | 10/1972 | Kutsay | |
|---|---|---|---|---|
| RE32,746 E | * | 9/1988 | Nelson et al. | 73/779 |
| 4,782,706 A | * | 11/1988 | Kister et al. | 73/779 |
| 5,114,096 A | * | 5/1992 | Wernicke | 244/7 B |
| 6,140,942 A | | 10/2000 | Bragg et al. | |
| 6,672,540 B1 | * | 1/2004 | Shaheen et al. | 244/99.3 |

FOREIGN PATENT DOCUMENTS

EP 0 818 387 1/1998

* cited by examiner

*Primary Examiner*—Max Noori
(74) *Attorney, Agent, or Firm*—Young & Thompson

(57) ABSTRACT

A dynamometric rod intended to form a pivot for fixing an aircraft wing flap, includes a cylindrical body (10) with a hexagonal head (12) and a threaded end-piece (14). The dimensions and other characteristics of the body (10), head (12) and end-piece (14) correspond to those of pivots normally used for fixing wing flaps. The aforementioned body (10) is provided with a groove (16) which can be provided with a small depth of several tenths of a millimetre and which forms a simple gap which prevents contact between a branch of a clamp or an arm of the flap and the rod at the groove (16). In addition, a sensitive element (18) is positioned at the groove and is very tightly sealed closed. The invention is suitable for aircraft flaps.

10 Claims, 1 Drawing Sheet

APPARATUS FOR MONITORING AN AIRCRAFT FLAP AND APPLICATION OF A DYNAMOMETRIC ROD

TECHNICAL FIELD

The present invention relates to a device for monitoring the operation of an airplane control surface, the apparatus comprising a dynamometric pin, and the invention also relates to the use of such a pin for monitoring the presence of an airplane control surface.

PRIOR ART

U.S. Pat. No. 3,695,096 describes a dynamometric pin provided with strain gauges for the purpose of determining shear stresses in cranes, winches, transporters, and the like. The dynamometric pin comprises a cylindrical body of circular section having sensing elements such as strain gauges disposed therein. The end for passing wires connected to the sensing elements is provided with packing to ensure sealing. Such a dynamometric pin is used for determining forces acting across its length, and it includes at least one clearance groove for placing astride the interface between hinged elements. Housings formed in the grooves, in their outside surfaces, contain the sensing elements. The packing protects the sensing elements against bad weather, but the pin cannot be used in circumstances requiring particularly high ability to withstand bad weather (extreme temperature variations, the presence of water, ice, frost, etc.).

The trend in aviation regulations shows that it is ever more desirable to be aware of the state of certain active elements, such as control surfaces. For example, the wings of modern airplanes are provided with wing flaps that are hinged to the associated wing at at least two points. Such flaps are mounted on arms which generally include tracks along which wheels travel, and on which the flaps themselves are mounted. It can happen that a flap becomes separated from an arm. In the present state of aircraft construction, that phenomenon is not detected directly. Nevertheless, it can lead to significant damage to at least a portion of the wing.

Proposals have therefore been made to incorporate a sensing element for sensing the forces at each of the two fixing points of such a flap. Such a sensing element can be located at the connection between the flap and an arm, at the actuator which moves the flap, or at the connection between the arm and the wing.

U.S. Pat. No. 6,140,942 relates to a system for detecting contamination of an airplane control surface, in particular by icing. That system relies on detecting the moment that is applied to the control surface. That specification states that the detector used may be a normal strain-gauge detector which detects the moment applied to the control surface. It also states that other devices could be suitable.

European patent application EP-0 818 387, filed in the name of the Boeing, relates exactly to the problem addressed by the present invention, i.e. monitoring flaps. The embodiment described in that patent application makes use of sensors having proximity detectors and position detectors. The difference between the data from two detector systems serves to determine a fault in flap positioning.

Nevertheless, none of those previously-envisaged techniques have given satisfaction until now, firstly because they are usually poor at withstanding bad weather in use (sealing problem), and secondly because they require more or less significant changes to the wing flaps, the support arms, or the portion of the wing that supports said arms (mounting problem).

The two drawbacks mentioned above are so significant that such systems have not yet been incorporated in airplanes other than as prototypes for testing.

SUMMARY OF THE INVENTION

According to the invention, the problems firstly of sealing and secondly of mounting are solved merely by replacing a connection element that already exists between the wing and the wing flap, and doing so in a manner that is extremely well sealed.

This object is achieved by using a dynamometric pin for replacing a flap hinge pivot. The pin differs from dynamometric pins or shafts known in the prior art firstly because its sensing elements are enclosed inside the body of the pin, which is itself closed by packing, so they are not subjected to bad weather, and secondly because they possess the external characteristics of the pivots presently in use for mounting flap arms, and so they require no modification to the flaps, to the arms, or to the wing.

More precisely, the invention provides a device for monitoring the operation of an airplane control surface, the control surface being mounted on at least two arms each hinged about an axis on a portion of an airfoil, at least one of the two arms being mounted on the associated airfoil by a hinge that comprises at least one pivot, at least one U-bolt having at least two limbs with orifices in alignment on said axis for passing the pivot, and a captive member having an orifice for passing the pivot and having a limited range of displacement between the limbs of the U-bolt along the axis, the pivot possessing a cylindrical body, a head of cross-section that is not circularly symmetrical so as to enable it to co-operate with a driver tool for turning it, and a threaded end opposite from the head. According to the invention, the pivot is constituted by a dynamometric pin comprising a body of circularly cylindrical shape, a head of cross-section that is not circularly symmetrical so as to enable it to co-operate with a driver tool for turning it, and a threaded end opposite from the head, the body of the pin having at least one peripheral set-back groove; the body of the pin has a cavity that opens out at one end of the body, that reaches at least the level of the set-back groove, and that contains at least one force-sensing element disposed against the wall of the cavity level with the set-back groove, the opening of the cavity which opens out at one end of the body being closed in weatherproof manner while allowing wires connected at least to the force-sensing element to pass through; the head and a nut screwed onto the threaded end are in direct or indirect contact with the limbs of the U-bolt, such that the groove in the body of the pin overlies the interface between one of the limbs of the U-bolt and the adjacent portion of the captive member; the size of the displacement range of the captive member between the limbs of the U-bolt, and the width of the groove, presenting a relationship such that one edge of the groove is located within the limb, and the other edge is located within the captive member; the head has an angular position such that at least the sensing element is sensitive to forces acting across the length of the pin; and the device further includes a signal processor circuit using at least one signal from at least one sensing element of the pin to determine at least whether the control surface is present.

Preferably, the pin has two grooves each associated with at least one sensing element and disposed respectively at the interfaces of the arm with each of the limbs.

Advantageously, the head of the pin possesses a marker for angularly positioning at least the sensing element relative to the U-bolt or to the captive member.

In an embodiment, the pin includes, at least at the level of a groove, a plurality of sensing elements disposed regularly in a circle so that the signals from the sensing elements enable the force to be determined independently of the angular orientation of the pin, by means of an operation selected between: selecting a sensing element at a suitable angular orientation; and processing signals from a plurality of sensing elements to derive a suitable signal.

In an embodiment, the pin further includes an amplifier circuit card placed between at least one sensing element and wires exiting from the pin.

In an embodiment, the pin further possesses packing for passing in weatherproof manner wires connected at least to the sensing element.

The control surface may be selected from: an aileron; a wing flap; an air brake; a tail stabilizer elevator; and a tail rudder.

The invention also provides the use of a dynamometric pin in determining the presence of an airplane control surface in the context of monitoring the operation of an airplane, the control surface being mounted on at least two arms, each hinged about an axis on a portion of an airfoil, at least one of the two arms being mounted on the associated airfoil by a hinge that comprises at least a pivot, at least a U-bolt having at least two limbs with orifices in alignment on said axis to pass the pivot, and a captive member having an orifice for passing the pivot and having a limited displacement range between the limbs of the U-bolt along the direction of the axis, the pivot possessing a cylindrical body, a head of cross-section that is not circularly symmetrical so as to enable it to co-operate with a driver tool for turning it, and a threaded end opposite from the head. According to the invention, this use comprises:

making a dynamometric pin comprising a body of circularly cylindrical shape, a head of cross-section that is not circularly symmetrical so as to enable it to co-operate with a driver tool for turning it, and a threaded end opposite from the head, the dimensions in length and diameter of the body of the pin being practically identical to those of the pivot, the body of the pin having at least one peripheral set-back groove and a cavity that opens out to one end of the body, that reaches at least the level of the set-back groove at least, and that contains at least one force-sensing element disposed against the wall of the cavity level with the set-back groove, the opening of the cavity that opens out to one end of the body being closed in weatherproof manner while allowing wires connected to the force-sensing element to pass through;

replacing the pivot with the dynamometric pin so that the head and a nut screwed onto the threaded end are in direct or indirect contact with the limbs of the U-bolt so that the groove of the body of the pin overlies the interface between a limb of the U-bolt and the adjacent portion of the captive member, the size of the displacement range of the captive member between the limbs of the U-bolt and the width of the groove presenting a relationship such that one edge of the groove lies within the branch and the other edge within the captive member;

adjusting the angular position of the head so that the sensing element is sensitive at least to forces acting across the length of the pin; and signal processing at least one signal from at least one sensing element of the pin in order to determine at least whether the control surface is present.

Preferably, the signal processing serves to compare the signal from at least one sensing element with at least one element selected from a threshold value and a range of values. By way of example, it is advantageous for the signal processing to compare the signals from at least two dynamometer pins.

BRIEF DESCRIPTION OF THE DRAWING

Other characteristics and advantages of the invention will be better understood on reading the following description of embodiments, given with reference to the accompanying drawing, in which.

BEST MANNER OF PERFORMING THE INVENTION

Figure 1:
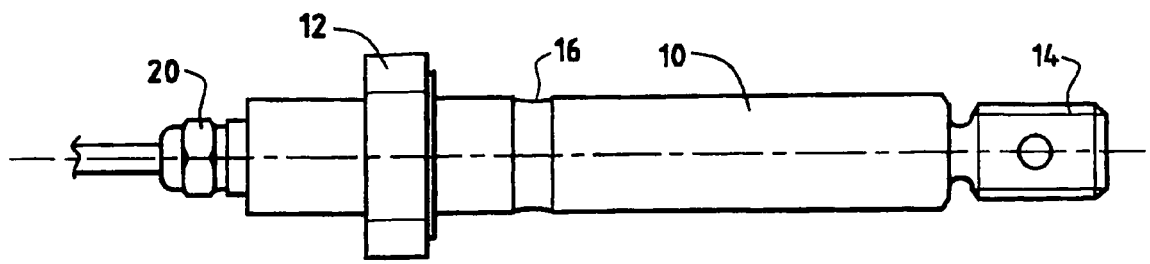
FIG. 1 shows a dynamometric pin of the invention for use as a replacement of an airplane flap mounting pivot.

FIG. 1 shows an example of a dynamometric pin of the invention. It is designed to take the place of a pivot pin for fastening a wing flap.

The pin possesses a cylindrical body 10 having a hexagonal head 12 at one end, and a threaded endpiece 14 at its other end. The dimensions and other characteristics of the body 10, of the head 12, and of the endpiece 14 corresponds to those of the pivot pins normally used for fastening wing flaps. However, it is preferable for the steel used to make the body to be of very high quality, for example of the APX4 type from Aubert et Duval.

The body 10 possesses a groove 16 which may be shallow, having a depth of a few tenths of a millimeter, since it merely constitutes a setback to prevent contact between an arm or a limb of a U-bolt and the pin in the groove 16.

Figure 2:
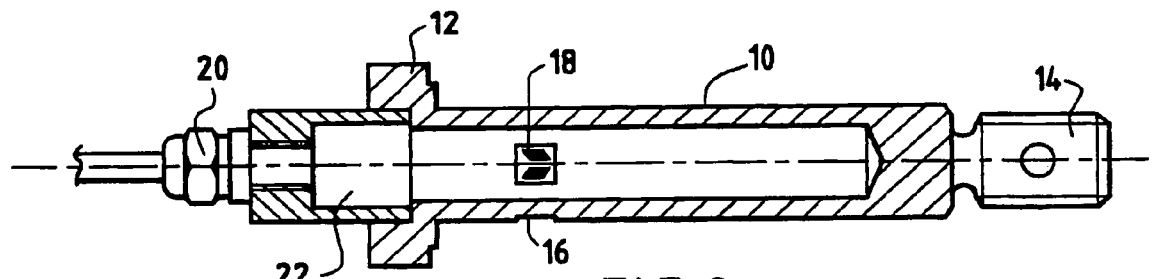
FIG. 2 is a fragmentary longitudinal section of the FIG. 1 pin.

FIG. 2 shows that level with the groove 16, inside the hollow body of the pin 10, there is disposed at least one sensing element 18, e.g. a film strain gauge, such as a gauge of the Vishay N2A 06T 031 L350 type.

The pin also includes packing 20 mounted at the end of the body 10 so as to allow wires from the sensing element 18, or from other sensing elements that might be incorporated, and from an amplifier circuit that might be mounted in a housing 22, to pass out from the body in weatherproof manner. Packing is known in the art that can withstand the extreme conditions to which such dynamometric pins can be subjected. In such conditions, temperature can vary over the range −55° C. to +125° C., often in the presence of water, ice, frost, and various oils and greases, such as "Skydrol" hydraulic fluids.

The pin as described in this way presents very good sealing.

It is also known that prior dynamometric shafts have a preferred detection direction. That direction depends on the positions of the sensing elements on the dynamometric shaft.

For the pin shown in FIGS. 1 and 2, it is appropriate, for example, for the center of the sensing element 18 to lie in a radial plane forming an angle of 17.5° with the plane of application of the force by the arm mounted on the pin. Unlike prior dynamometric shafts which require a keying device for co-operating with a complementary keying device on which it is mounted, with the pin of the invention, this orientation is obtained easily by turning the pin using the hexagonal head 12 while it is being clamped into place by a nut mounted on the threaded endpiece 14.

Nevertheless, it can be advantageous to place two sensing elements in positions that are diametrically opposite or nearly diametrically opposite.

In another variant, a set of sensing elements, e.g. six elements, are distributed at regular angular intervals inside the pin, and an electronic circuit for processing the signals from the sensing elements determines which signal to use, either because it is the signal from the properly oriented sensing element, or because it is a signal that is obtained by processing and that is representative of the signal that would have been given by a sensing element having the expected orientation.

Such processing circuits are not described since they are well known to the person skilled in the art.

Figure 3:
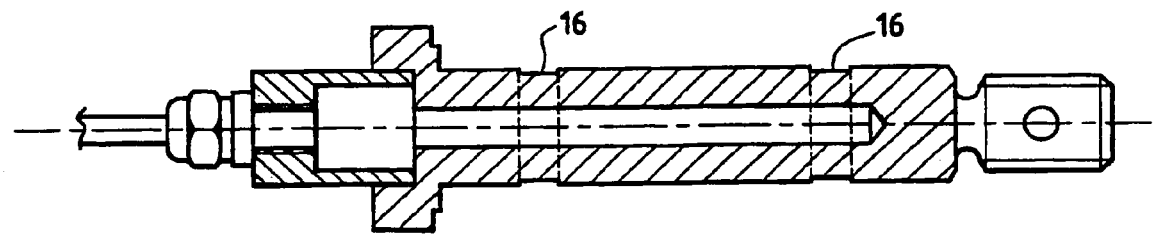
FIG. 3 is a section of a pin constituting a variant of FIG. 1, in which the pin body has two grooves.

FIGS. 1 and 2 show a dynamometric pin having only one groove that is for placing at the interface between an arm and a U-bolt. However, it is possible to make a pin of the kind shown in FIG. 3 having two grooves 16 for placing at the two interfaces between the arm and the two limbs of the U-bolt.

Figure 4:
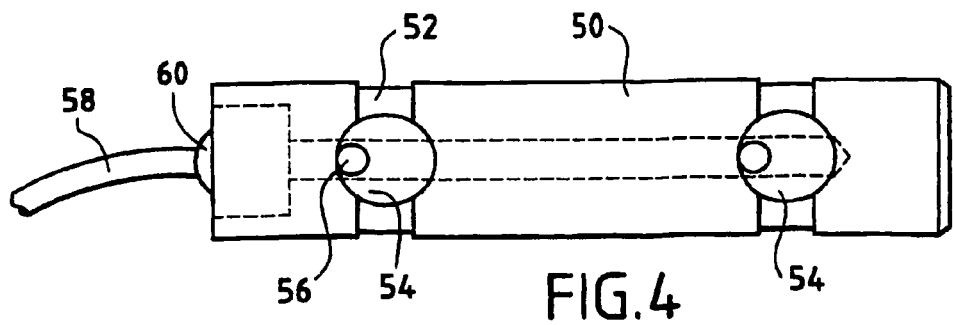
FIG. 4 shows an example of a prior art dynamometric shaft presenting the drawbacks of prior art devices.

FIG. 4 shows a prior type of dynamometric shaft. Such a shaft comprises a body 50 of cylindrical shape with at least one groove 52 for determining the force application regions. The housings 54 are formed in grooves for housing sensing elements, each of which is connected via a hole 56 to a cable 58 that exits via packing 60. The use of a shaft of the kind shown in FIG. 4 in the intended application raises numerous problems. Firstly, it is necessary to obtain excellent sealing throughout the housing 54, both in the bottom of the groove 52 and at the surface of the body 50. Such sealing is difficult to obtain under the conditions of use under consideration.

Furthermore, such dynamometric shafts are positioned with the help of a keying device. It is therefore necessary to modify either the U-bolt or the arm of the aircraft on which the shaft is to be mounted in order to obtain suitable positioning by means of the keying device which is generally in the form of a groove. The use of such a shaft therefore requires elements of the airplane to be modified, unlike the use of dynamometric pins of the invention.

Although a pin is described above having a head that is hexagonal, the head could be of any other shape, and preferably of a shape that corresponds to that of the pivot it replaces.

The invention thus provides device for monitoring the operation of an airplane flap, i.e. either the mere fact that the flap is present (i.e. that is has not become detached from an arm), or else more generally the forces applied to the flap, from which it is possible to deduce information that is of great use in piloting airplanes.

Although the invention is described above in its use with a wing flap, it is also suitable for use with other airplane control surfaces such as ailerons, air brakes, tail stabilizer elevators, and tail rudders.

The invention thus provides the use of such a dynamometric pin in determining the presence of an airplane control surface in the context of monitoring the operation of an airplane.

Naturally, the person skilled in the art can make various modifications to the devices and uses described above purely by way of non-limiting example, without thereby going beyond the ambit of the invention.

The invention claimed is:

1. A device for monitoring the operation of an airplane control surface, the control surface being mounted on at least two arms each hinged about an axis on a portion of an airfoil, at least one of the two arms being mounted on the associated airfoil by a hinge that comprises at least one pivot, at least one U-bolt having at least two limbs with orifices in alignment on said axis for passing the pivot, and a captive member having an orifice for passing the pivot and having a limited range of displacement between the limbs of the U-bolt along the axis, the pivot possessing a cylindrical body, a head of cross-section that is not circularly symmetrical so as to enable it to co-operate with a driver tool for turning it, and a threaded end opposite from the head, the device being characterized in that:

the pivot is constituted by a dynamometric pin comprising a body (10) of circularly cylindrical shape, a head (12) of cross-section that is not circularly symmetrical so as to enable it to co-operate with a driver tool for turning it, and a threaded end (14) opposite from the head (12), the body (10) of the pin having at least one peripheral set-back groove (16);

the body (10) of the pin has a cavity that opens out at one end of the body, that reaches at least the level of the set-back groove (16), and that contains at least one force-sensing element (18) disposed against the wall of the cavity level with the set-back groove (16), the opening of the cavity which opens out at one end of the body being closed in weatherproof manner while allowing wires connected at least to the force-sensing element (18) to pass through;

the head (12) and a nut screwed onto the threaded end are in direct or indirect contact with the limbs of the U-bolt, such that the groove (16) in the body of the pin overlies the interface between one of the limbs of the U-bolt and the adjacent portion of the captive member;

the size of the displacement range of the captive member between the limbs of the U-bolt, and the width of the groove (16), presenting a relationship such that one edge of the groove (16) is located within the limb and the other edge is located within the captive member;

the head (12) has an angular position such that at least the sensing element is sensitive to forces acting across the length of the pin; and the device further includes a signal processor circuit using at least one signal from at least one sensing element (18) of the pin to determine at least whether the control surface is present.

2. A device according to claim 1, characterized in that the pin has two grooves (16) each associated with at least one sensing element (18) and disposed respectively at the interfaces of the arm with each of the limbs.

3. A device according to claim 1, characterized in that the head (12) of the pin possesses a marker for angularly positioning at least the sensing element (18) relative to the U-bolt or to the captive member.

4. A device according to claim 1, characterized in that the pin includes, at least at the level of a groove (16), a plurality of sensing elements (18) disposed regularly in a circle so that the signals from the sensing elements enable the force to be determined independently of the angular orientation of the pin, by means of an operation selected between: selecting a sensing element (18) at a suitable angular orientation; and processing signals from a plurality of sensing elements (18) to derive a suitable signal.

5. A device according to claim 1, characterized in that the pin further includes an amplifier circuit card placed between at least one sensing element (18) and wires exiting from the pin.

6. A device according to claim 1, characterized in the pin further possesses packing (20) for passing in weatherproof manner wires connected at least to the sensing element (18).

7. A device according to claim 1, characterized in that the control surface is selected from: an aileron; a wing flap; an air brake; a tail stabilizer elevator; and a tail rudder.

8. Method of using a dynamometric pin in determining the presence of an airplane control surface in the context of monitoring the operation of an airplane, the control surface being mounted on at least two arms, each hinged about an axis on a portion of an airfoil, at least one of the two arms being mounted on the associated airfoil by a hinge that comprises at least a pivot, at least a U-bolt having at least two limbs with orifices in alignment on said axis to pass the pivot, and a captive member having an orifice for passing the pivot and having a limited displacement range between the limbs of the U-bolt along the direction of the axis, the pivot possessing a cylindrical body, a head of cross-section that is not circularly symmetrical so as to enable it to co-operate with a driver tool for turning it, and a threaded end opposite from the head, the method comprising:

making a dynamometric pin comprising a body (10) of circularly cylindrical shape, a head (12) of cross-section that is not circularly symmetrical so as to enable it to co-operate with a driver tool for turning it, and a threaded end opposite from the head (12), the dimensions in length and diameter of the body (10) of the pin being practically identical to those of the pivot, the body (10) of the pin having at least one peripheral set-back groove (16) and a cavity that opens out to one end of the body, that reaches at least the level of the set-back groove (16) at least, and that contains at least one force-sensing element (18) disposed against the wall of the cavity level with the set-back groove (16), the opening of the cavity that opens out to one end of the body being closed in weatherproof manner while allowing wires connected to the force-sensing element (18) to pass through;

replacing the pivot with the dynamometric pin so that the head (12) and a nut screwed onto the threaded end are in direct or indirect contact with the limbs of the U-bolt so that the groove (16) of the body of the pin overlies the interface between a limb of the U-bolt and the adjacent portion of the captive member, the size of the displacement range of the captive member between the limbs of the U-bolt and the width of the groove (16) presenting a relationship such that one edge of the groove (16) lies within the branch and the other edge within the captive member;

adjusting the angular position of the head (12) so that the sensing element (18) is sensitive at least to forces acting across the length of the pin; and signal processing at least one signal from at least one sensing element (18) of the pin in order to determine at least whether the control surface is present.

9. The method according to claim 8, characterized in that the signal processing is for comparing the signal from at least one sensing element (18) with at least one element selected from a threshold value and a range of values.

10. The method according to claim 8, characterized in that the signal processing is for comparing the signals from at least two dynamometer pins.

* * * * *

UNITED STATES PATENT AND TRADEMARK OFFICE
CERTIFICATE OF CORRECTION

| | | |
|---|---|---|
| PATENT NO. | : 7,299,702 B2 | Page 1 of 1 |
| APPLICATION NO. | : 10/520938 | |
| DATED | : November 27, 2007 | |
| INVENTOR(S) | : Francis Gibert | |

It is certified that error appears in the above-identified patent and that said Letters Patent is hereby corrected as shown below:

On the title page, item (73) should read as follows:

--(73) Assignee: FGP Instrumentation, Les Clayes-Sous-Bois (FR)--.

Signed and Sealed this

Twenty-fourth Day of March, 2009

JOHN DOLL
*Acting Director of the United States Patent and Trademark Office*